United States Patent [19]
Burnham

[11] 3,903,407
[45] Sept. 2, 1975

[54] METHOD FOR CORRELATING FREQUENCY-MODULATED SIGNALS

[75] Inventor: Bradshaw Burnham, Rochester, N.Y.

[73] Assignee: The United States of America as represented by the Secretary of the Navy, Washington, D.C.

[22] Filed: Dec. 11, 1963

[21] Appl. No.: 329,932

[52] U.S. Cl. ... 235/181; 340/15.5 SC; 343/100 CL; 324/77 K
[51] Int. Cl.² ............... G06G 9/00; G06G 7/19
[58] Field of Search .... 343/5 MM, 5 PR, 17, 100.7; 340/15.5 C; 346/107; 235/181; 350/161

[56] References Cited
UNITED STATES PATENTS

| | | | |
|---|---|---|---|
| 2,463,534 | 3/1949 | Hawkins | 340/15.5 |
| 3,127,607 | 3/1964 | Dickey | 343/5 |
| 3,155,451 | 11/1964 | Dunster et al. | 343/100 CL |
| 3,157,874 | 11/1964 | Altar et al. | 343/100 CL |

Primary Examiner—Felix D. Gruber
Attorney, Agent, or Firm—R. S. Sciascia

[57] ABSTRACT

Apparatus and method for correlating frequency-modulated signal wavetrains with their return signal wavetrains which includes compensating for delay distortions in the signal while passing through a medium. Correlation is accomplished by photo-optical apparatus.

3 Claims, 8 Drawing Figures

METHOD FOR CORRELATING FREQUENCY-MODULATED SIGNALS

This invention relates to an improved method employing photo-optical data correlators.

Photo-optical data correlators are described in patent applications Ser. No. 26,916, now U.S. Pat. No. 3,427,104 "Optical Plural Channel Signal Data Processor", Blikken et al., and Ser. No. 96,052, now U.S. Pat. No. 3,519,331 "Two-dimensional Optical Data Processor", Cutrona et al. These data correlators are employed, for example, in conjunction with sonar or radar systems to identify target return signals and to indicate such data as target location and speed. To accomplish such functions, received signals are recorded on a strip of film and are optically correlated against a reference function consisting of the transmitted signal, which is recorded on another strip of film. (To make the following discussion more specific, the photo-optical correlator will be considered to be associated with an underwater sonar system.)

Different frequencies of sonar signals propagate at different velocities in the oceanic medium, just as different frequencies of electrical signals propagate at different velocities over telephone cables. This leads to an undesirable condition called delay (or phase) distortion which makes more difficult the correlation of the transmitted signal with its returns from a target.

Other factors which result in delay distortions of the transmitter driving function are of the "man-made" type and include characteristics of the power amplifier and projector (or transmitter), the receiving hydrophone (transducer) array, receiving pre-amplifiers, bandpass filters, time-multiplex microwave-relay encoding and decoding, and the heterodyne process. These distortions may be termed equipment distortions.

The primary object of this invention is, therefore, to provide means to continuously compensate for the delay distortions which occur in a known signal in passing through a medium and a signal-processing system having fixed and/or variable delay distortions, and thereby to improve the performance of a photo-optical signal-correlation system.

Other objects and many of the attendant advantages of this invention will be readily appreciated as the same becomes better understood by reference to the following detailed description when considered in connection with the accompanying drawings wherein.

Figure 8:
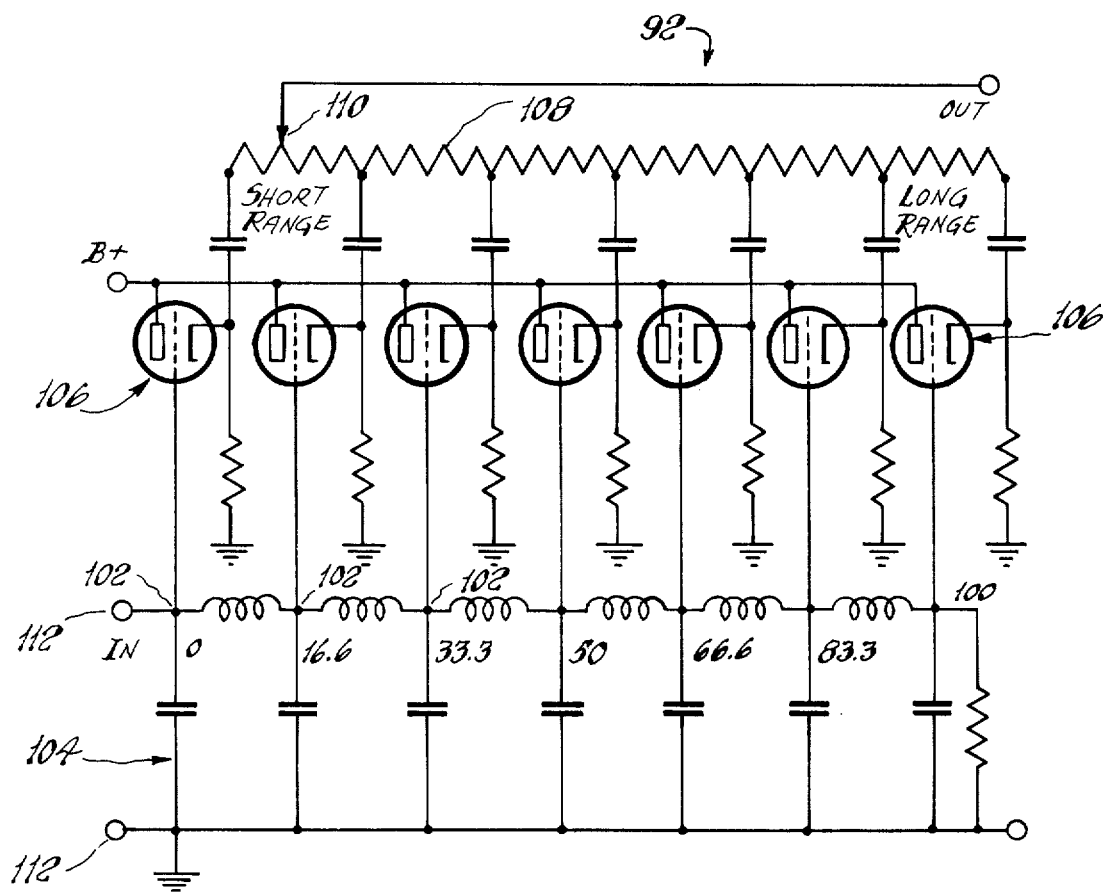

FIG. 8 is a schematic diagram illustrating a possible circuit for the interpolating delay-line means. The objects of the invention are accomplished by utilizing moving continuous loop for the film on which the reference function is recorded. A moving continuous loop permits the reference function to be continuously variable, having a fixed amount of delay correction for man-made distortions and a time-variable amount of delay correction for signal path distortions. Also, a continuous loop permits uninterrupted repetition of the reference function.

Figure 1:
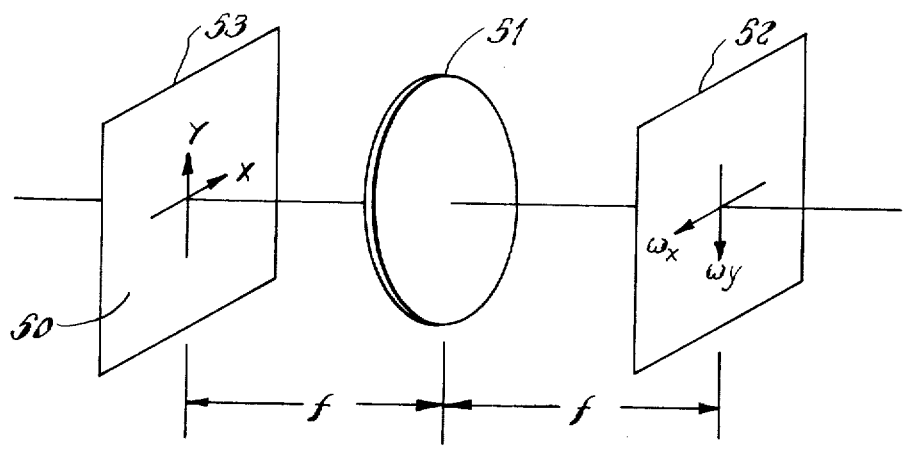
FIG. 1 is a three-dimensional view showing the Fourier transformation of the signal f(x,y)
Figure 2:
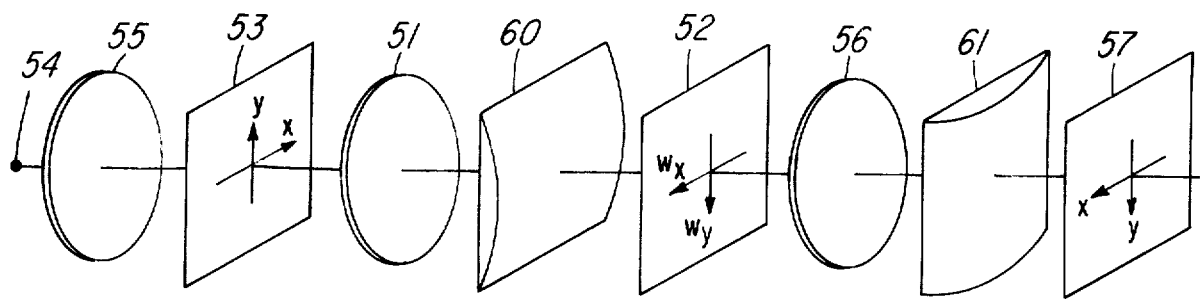
FIG. 2 is a three-dimensional view similar to that of FIG. 1, wherein an inverse transform of $F(\omega_x,\omega_y)$ is produced.

FIG. 1 and 2 and the following description of them are taken from the previously mentioned patent application Ser. No. 96,052, "A Two-dimensional Optical Data Processor", and serve as an example of a photo-optical correlator the performance of which can be improved by the technique of the present invention.

"When a lens is illuminated with coherent light, which in this application shall be considered as monochromatic light that may be collimated in the $x$ and $y$ direction, the light-amplitude distributions at the front and back focal planes are related by a two-dimensional Fourier transformation $$A_b(\omega_x,\omega_y) = \iint a_f(x,y)\exp\{j\,(\omega_x x + \omega_y y)\}dxdy$$

where $A_f$ is the complex amplitude at the back focal plane, and $x,y$, and $\omega_x,\omega_y$ are the coordinates at the front and back focal planes, respectively.

In FIG. 1 if a signal is written as a density variation on a transparency 50, such as a photographic film located at the front focal plane of a lens 51, such that the transmittance of film is $s(x,y)$ and if the film is coherently illuminated, then, the light distribution at the back focal plane indicated as 52 is a two-dimensional Fourier transform $s(\omega_x,\omega_y)$ of $s(x,y)$.

Referring now to FIG. 2, monochromatic light from a point source 54 is collimated by a lens 55 so that to illuminate the function $s(x,y)$ on film 50 the Fourier transform of $s(x,y)$ will be displayed at plane 52. The lens 56 will then take the inverse transform which will be displayed at plane 57 where we again find $s(x,y)$. In the language of optics we see that the lens combination 51 and 56 has produced an image of $s(x,y)$ at 57. For the purpose of this disclosure, planes 53 and 57 will be indicated as spatial domain, in analogy with the time domain of communication theory, and plane 52 as the spatial frequency domain or, in short, the frequency domain.

In each of these domains there exists a spatial distribution of light energy upon which multiplicative operations may easily be performed. Transparencies of specified transmissivity placed in one of these planes will offset a multiplication in the corresponding domain. The transparency performs as a filter and construction of the proper transparency constitutes the filter synthesis problem.

The transparencies described here can be complex. By this is meant that the transparency can modulate either the amplitude or phase of the incident light. Suppose that the transparency has an amplitude transmissivity $A(x,y)$, defined as the ratio of the square root of the ratio of emergent to incident light intensity. The square root is taken, because the coherent optical system is linear with respect to the light amplitude which is proportional to the square root of intensity. Suppose, further, that the transparency retards the phase of the transmitted light in accordance with the relation $$\psi = \psi(x,y)$$

The transparency then is said to have the complex transmittance:

$$A(x,y) \exp\{j\psi(x,y)\}$$

Suppose a transparency $R(\omega_x,\omega_y)$ with complex transmittance to be inserted in the plane 52 of FIG. 2 effecting the operation.

$$V(\omega_x,\omega_y) = S(\omega_x,\omega_y) R(\omega_x,\omega_y)$$

where $S(\omega_x,\omega_y) = T[s(x,y)] =$ Fourier transform of $s(x,y)$. This is a filtering operation, and the transparency $R = |R| \exp\{j\psi\}$ is a filter which modifies the spectral content of the signal $s(x,y)$. The amplitude variation, R, is obtained by varying the optical density of the transparency: the phase portion is obtained by varying the thickness of the transparency, and hence the phase retardation. At 57, the signal is transformed back to the spatial domain, and is given by:

$$v(x,y) = \iint s(x-\alpha, y-\beta) r(\alpha,\beta) \, d\alpha \, d\beta$$

where $$r(x,y) = T[R(\omega_x,\omega_y)]$$
$$v(x,y) = T[V(\omega_x,\omega_y)]$$

This is a convolution integral.

The transparency R in simple form may consist of a slit or other aperture. Such apertures are low-pass or band-pass spatial filters. A stop becomes a band-rejection filter. The use of a phase plate causes a phase shift of a portion of the spectrum with respect to the remainder. This is the principle of phase contrast microscopy. Complex filter funtions are possible, and it appears that one has independent control over both phase and amplitude, so that essentially any filter function can be synthesized.

As an alternative to inserting a transparency at 52 (the frequency domain), a transparency $r(x,y)$ also with complex transmittance, can be introduced into the spatial domain at 53. If provision is made for translating $s(x,y)$ in the x-y plane, relative to $r(x,y)$, the signal at plane 57 becomes $v'(x',y',\omega_x,\omega_y) = T[s(x-x', -y') r(x,y)]$. Here $x'$ and $y'$ measure the lateral displacement between $s$ and $r$. At the position $\omega_x = \omega_y = 0$, the integral becomes $$V'(x',y') = \iint s(x-x', y-y') r(x,y) \, dx' \, dy'$$ which has the form of a cross-correlation. By reversing the coordinate system of $s$, i.e., $$x - x' \rightarrow x' - x$$
$$y - y' \rightarrow y' - y$$

one obtains the convolution integral $$V'(x',y') = \iint \beta(x' - x, y' - y) r(x,y) \, dx \, dy$$

This is identical in form with Equation 5. Therefore, two methods are available for synthesizing a required transfer function:

1. The frequency domain systhesis, in which a complex transmittance function (called a filter) is introduced in the frequency domain, 52, and operates directly on the frequency spectrum; and 2. The spatial domain synthesis, in which a complex transmittance function (called a reference function) is introduced in the spatial domain, 53, and operates directly upon the signal function.

The two techniques, therefore, produce the same result, as indeed they should. The display is different, however. With the frequency domain operation, an area display is produced, in which the variable $x,y$ are the coordinates of the plane 57. With the spatial-domain operation, the output display is only a point (viz, $\omega_x = \omega_y = 0$) and the coordinates $x', y'$ are generated as functions of time by physical displacement of $s$ with respect to $r$. The latter instrumentation requires a scanning mechanism; the former or filter technique does not.

It is possible and often advantageous to divide a required operation $s$ into two portions, one carried out in the spatial domain and the other in the frequency domain. The output at plane 57 becomes $$T\{T[s(x,y) r_1(x,y)] R_2(\omega_x,\omega_y)\}$$

where $r_1$ is a reference function, inserted at 53 or spatial domain, the $R_2$ is a filter function, inserted at 52, or frequency plane.

The optical systems discussed thus far perform a two-dimensional operation. This feature is useful if the signal is a function of two variables, for then the signal can be displayed as a two-dimensional function and processed simultaneously in both variables. An electronic system, having only time as the independent variable, would require a scanning technique to perform the two-variable operation.

More often, the signal is one-dimensional in nature and the additional variable is not required. In such a case, the second variable can be used to provide a multiplicity of independent channels so that many one-dimensional signals can be processed simultaneously. The signals to be processed are written as $s_y(X)$, and are stacked on the transparency with respect to the y-variable. The resultant transparency is thus of the form $s(x,y)$ as before, except now $y$ is a parameter, which takes on many values as there are independent channels to process. The limit on this is, of course, the number of resolvable elements possible across the y-dimension of the optical system aperture.

The processing is to be done with respect to the x-variable only. The y-dimension channels must remain separated. The optical system of FIG. 2, when modified as shown in FIG. 3, performs in the required manner.

Figure 3:
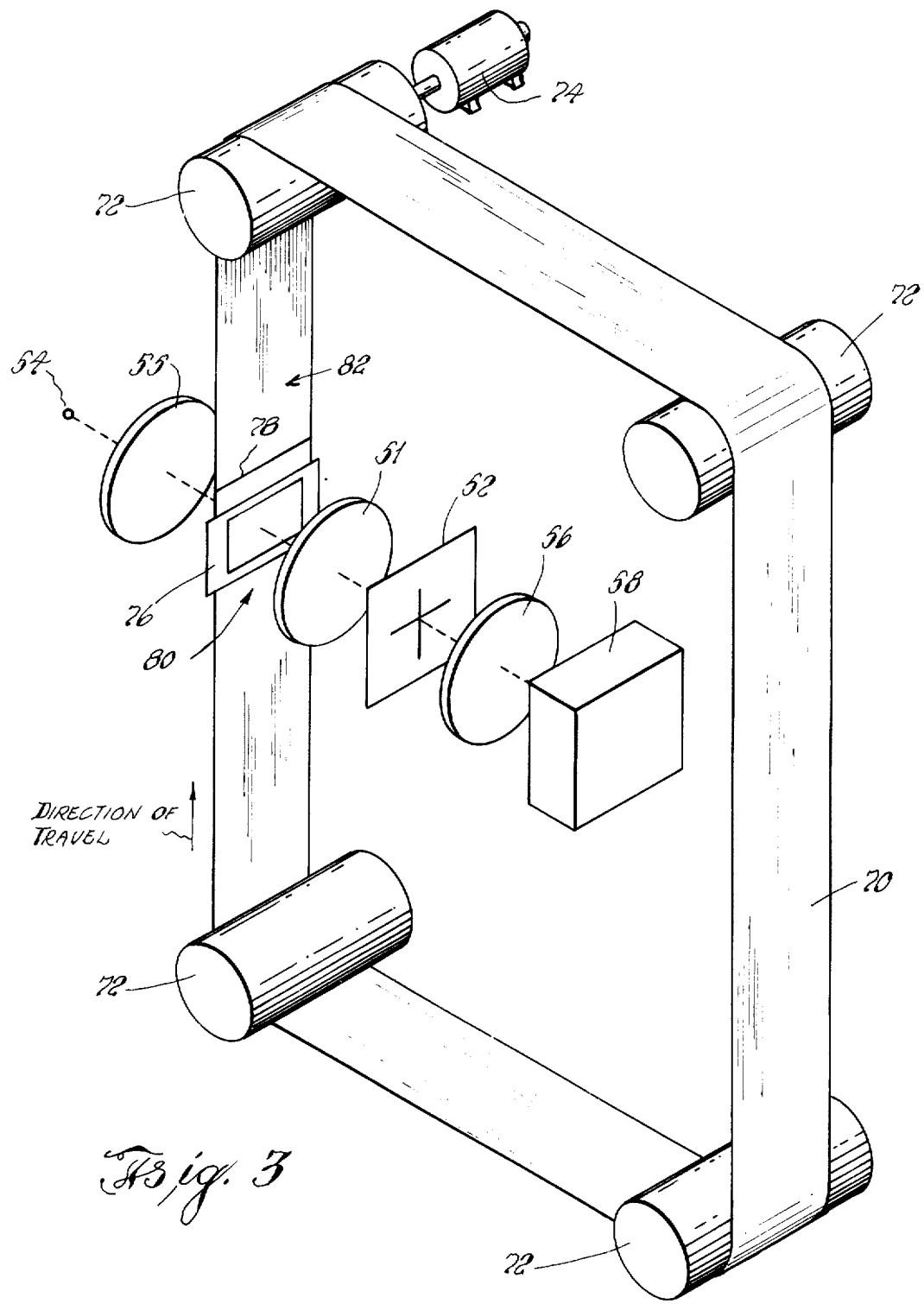
FIG. 3 is a schematic illustration of the invention.

In FIG. 3 the coordinate system $x,y$ is again at 53 as before. Then if we wish a display $s(\omega_x,y)$ at 52, we must effect a Fourier transform with respect to $x$ only and preserve the y-dimension. A cylindrical lens 60, which has focal power in one dimension only, can effect a one-dimensional Fourier transformation. To display the y-dimension at 52, it is necessary to image the signal at 53 on plane 52 which constitutes a double Fourier transformation between 53 and 52 with respect to the y-variable. The cylindrical lens 60 in combination with the spherical lens 51 is placed between 53 and 52. The cylindrical lens exerts focal power in the y-dimension only and by itself produces a Fourier transformation with respect to $y$. The lens 51 by itself introduces a two-dimensional Fourier transformation; therefore, the two lenses in combination produce a double transformation with respect to $y$ and a single transformation with respect to $x$. Coordinate system $(\omega_x,y)$ therefore appears at 52. Ideally, of course, we should like to have the y-dimension at 53 transferred directly to 52. This is possible only by imaging 50 at 52 which, of course, implies a double Fourier transformation.

A filter element $R(\omega_r,y)$ inserted at 52 may be interpreted as a multichannel one-dimensional filter which processes each channel independently. A cylindrical lens 61 placed between 52 and 57 acts together with lens 56 to provide a second transformation with respect to $\omega_r$. Thus, the output at 57 displays the input function after modification by the filter at 52.

A simplification is possible if the signals in all channels are to be processed identically. Separation of the channels at the plane 52, or frequency plane, is no longer necessary. In this event, the cylindrical lenses are not required and the optical system reverts to that of FIG. 2. The function displayed at the frequency plane 52 is, as earlier, $S(\omega_r,\omega_y)$. The filter element takes the form $R(\omega_r)$, being independent of $\omega_y$. The function displayed at plane 57 is modified with respect to the x-dimension frequencies only. The operation can be written as $$v(x,y) = T [S(\omega_r,\omega_y) R(\omega_r)]$$
$$= \int s(x-\alpha,y) r(\alpha) d\alpha$$

As in the two-dimensional processor, the required transfer function can be synthesized in the spatial domain. The optical system of FIG. 3 suffices, except that the output is taken at 52, and the portion of the system beyond this plane is not required. The integral evaluated when a slit is placed along the line $\omega_r = $ . is $$V'(x',y') = \int s(x-x',y) r(x,y) dx$$

where, as before, $y$ is a parameter providing multichannel operation.

More complicated optical correlation systems are also described in patent application Ser. No. 96,052.

The present invention replaces the reference transparency at plane 53 by a continuous loop of film 70, supported and moved by rollers 72 at least one of which is rotated by a motor 74. Any other suitable means for moving the continuous loop of film through the collimated light beam emanating from light source 54 and collimating lens 55 may be employed. The film loop 70 travels past a gate 76 in the direction indicated. The film loop 70 travels past a gate 76 in the direction indicated. The gate 76 permits illumination of only the desired small section of the reference function on the film loop 70. The loop 70 is spliced along line 78, the short range portion of the reference function being located in the area indicated by reference numeral 80 and the long range portion of the reference function being located in the area indicated by reference numeral 82. Means for detecting and indicating the presence of a target return (large cross-correlation signal) is indicated by box 58, which is situated at plane 57 (see FIG. 2).

The nature of a reference function compensated for variable delay distortions and how it can be obtained are now discussed.

If the medium (seawater) transmits all of the frequency components of the projected signal at exactly the same velocity and attenuation, there is apparently no necessity for further modifying the derived reference function in the photo-optical correlator. That is, a fixed derived pattern (corrected primarily for equipment distortions) would be optimum for all ranges. If, however, the medium exhibits regular variation in velocity of propagation and/or attenuation versus frequency, the shape of the derived reference function should be changed gradually after each signal projection (signal transmission) to continuously match the waveform expected from echoes arising from targets at progressively increasing ranges.

The following theoretical example covers the case of delay distortion of a hypothetical projected wave in terms of frequencies and velocities that are familiar in sonar work. Suppose a projected signal 84 (see FIG. 4) comprising a sinuous chain of three tones has the form
 plus for 6 milliseconds, minus for 6 milliseconds,
 plus for 9 milliseconds, minus for 9 milliseconds,
 plus for 4 milliseconds, minus for 4 milliseconds,
this sequence of tones repeating over and over for approximately 45 seconds. The waveform signature may be expressed as 6/6, 9/9, 4/4, etc., for 45 seconds; it is assumed that each oscillation reaches a peak amplitude of 100 arbitrary units.

The velocity of propagation for sound in sea water is found to vary slightly with periodicity (frequency) as shown in the table below:

TABLE I

PROPAGATION VELOCITY VERSUS PERIODICITY

| Period Millisecs. | Apparent Frequency cycles/sec. | Velocity meters/sec. | Distance for 100 seconds meters | Relative position meters |
|---|---|---|---|---|
| 12 (6/6) | 83.33 | 1500.00 | 150,000 | 0 |
| 18 (9/9) | 55.56 | 1500.12 | 150,012 | +12 |
| 8 (4/4) | 125.00 | 1499.73 | 149,973 | −27 |

Anomalous dispersion, with the higher frequencies propagating at higher velocities, may possibly occur. Waveform distortion arises if there is significant dispersion, either normal or anomalous.

The exact prediction of sonic waveform evolution in ocean water for distances corresponding to the 0 to 100 second interval (assumed interval between time of propagation of projected signal and reception of return echo) is a ponderous mathematical task. Table I and FIG. 4 express this evolution for the assumed projection signature with an oversimplification geared to explanatory techniques.

Figure 4:
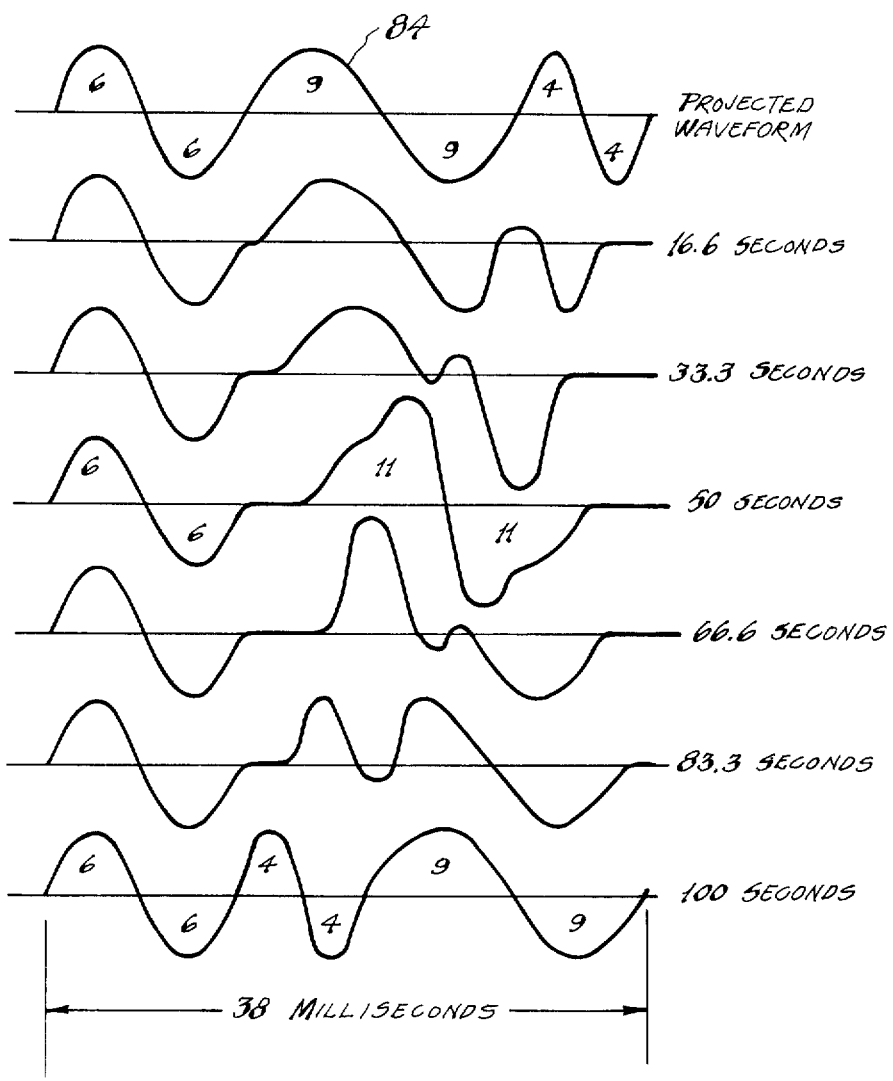
FIG. 4 is a diagram illustrating the evolution of the projected-signal waveform with range.

FIG. 4 indicates that the propagation velocity distortion after 100 seconds of travel has resulted in an interchange of the relative position of the 55.56 cycle and 125 cycle components. The original signature was 6/6, 9/9, 4/4, etc.; at the end of 100 seconds, the signature has become 6/6, 4/4, 9/9, etc. During the 100 second interval, the 9/9 and 4/4 components overlap in the process of interchanging their relative positions. This produces intermediate signatures which have considerably different axis-crossing times and may exhibit only four axis crossings instead of the normal expectancy of six axis crossings for each group of three waves. It is apparent that beyond 100 seconds a new result is to be expected since all three waves cross each other.

In general, the envelopes of constant amplitude projections become highly undulatory as they travel greater distances.

Figure 5:
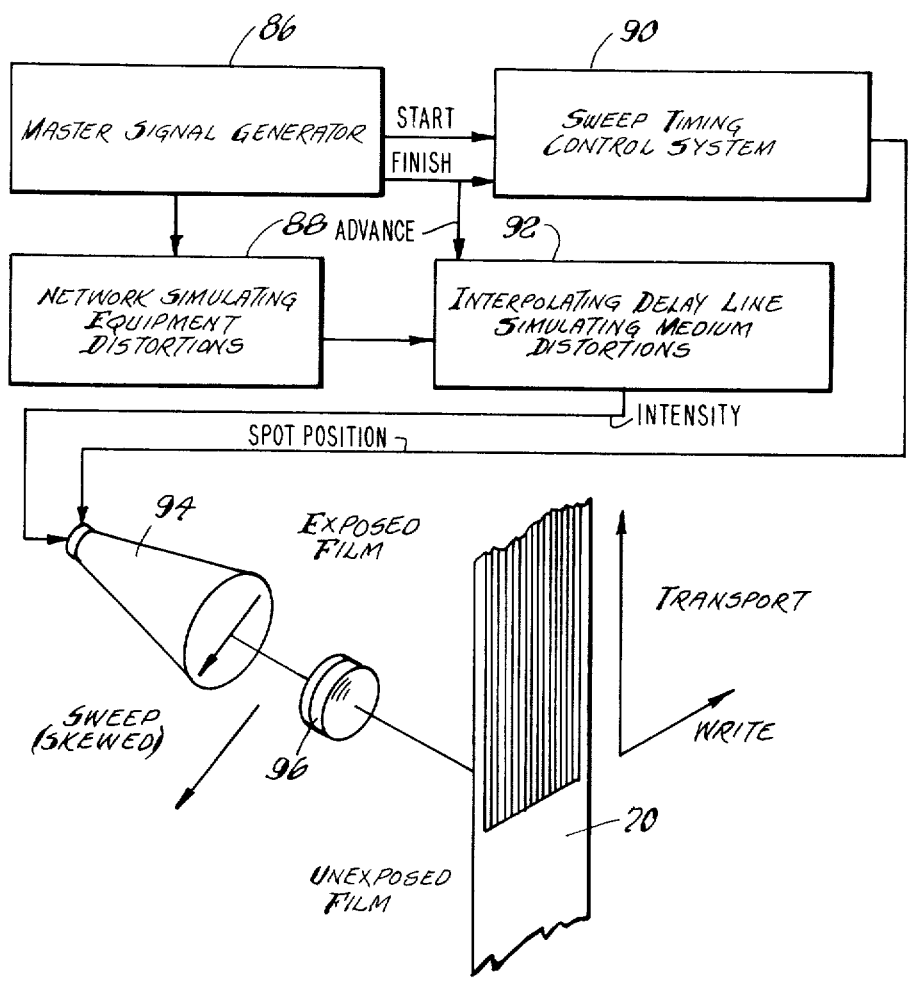
FIG. 5 is a schematic diagram, partially in block form, of the equipment used to form the delayed reference function on the film loop.

Means for obtaining the delayed reference function on the film loop is indicated in FIG. 5. A master-signal generator 86 provides the original, three-tone, repetitive waveform 84. The fixed delay representing the distortion introduced by the power amplifier, projector, hydrophone, preamplifier and associated band-limiting filter is derived from the proper network of electric wave filter sections 88. The fixed-delay signal is then passed through delay means 92 simulating the variable delay introduced by the medium to a bright-spot oscilloscope 94, the picture on the face of the oscilloscope 94 being focused by a lens system 96 on the film loop 70 as a photographic image. The film is then developed and the ends are spliced together to form a continuous loop as shown in FIG. 3.

The master-signal generator 86 is a source of wave trains containing hundreds or thousands of undulations (called a signature, or the original reference function) repeatable accurately for each transmission. This function may be satisfactorily accomplished by employing, for example, a matrix of bistable magnetic memory cores arranged in a predetermined order and magnetic condition. Sequentially scanning these cores with an electrically clocked series of interrogation pulses yields a repeatable sequence of memorized data in the following exemplary form, + + + + + + − − − + + − − − − + + + − − − − −, etc., synthesizing a rectangular train signature of several thousand undulations having precisely related, definable, and repeatable times of polarity reversal. This rectangular wave signature may be rounded to an approximately sinusoidal form to make it acceptable for power amplification and conversion to a transmitted radiation in the echo-ranging medium. In accordance with the usual practices in echo-ranging systems, the master-signal generator 86 also furnishes synchronizing pulses to control the action of other parts of the system typically, a start synchronizing pulse just before the commencement of a signature, and a finish synchronizing pulse just after the completion of a signature.

The extremely simplified exemplary waveform 84 illustrates that there are maximum-length undulations, minimum-length undulations, and intermediate-length undulations in the master-signal signature. The teaching of this invention is general in nature, showing how an improvement in correlation product can be attained with any signal which employs frequency-modulated waves without favoring or advocating any specific sequence or formulae determining the inter-relationship of successive undulations except that they be within a given passband and that signatures shall be repeatable with exactitude.

For each transmission, the master-signal generator 86 provides a signature wave train at the input terminals of the amplifier serving the underwater projectors. Phase and amplitude distortions of this master-signal arise progressively as the signal passes through the amplifier stages, output transformer, projectors, and into the water. Then, the water-transmitted waveform is distorted in being received by a hydrophone, preamplifiers and band-limiting filters customarily used to discriminate against background noises outside of the transmitted spectrum.

This invention includes the teaching that optimum correlation detection sensitivity for short-distance echo ranging is obtained by placing in the signal correlator not a copy of master-signal waveform applied to the input of the transmitting amplifiers, but instead a modified reference function representing the output of an actual receiver excited by the radiated transmissions in the medium. One method of obtaining such a modified (or evolved) reference function is to place a monitoring hydrophone in the water relatively close to the projector and to use actual waterborne signals to record "wet" reference functions. Alternatively, since the effects of amplitude and phase distortion between the input terminals of the transmitting system and the output terminals of a nearby receiving apparatus are, in combination, a relatively simple band-pass amplitude and phase characteristic and can be readily established by direct physical measurement of the equipments separately or in combination operating over a short distance through water, the distortion characteristic can be simulated by a network of filter sections as indicated in FIG. 5 by block 88. The synthesis of such band-pass filter networks to prescribed amplitude vs. frequency and phase vs. frequency characteristics is well known.

The master-signal waveform, after modification for fixed-equipment distortions by network 88, is passed through delay means 92 to be further adjusted for the propagation characteristics of the echo-ranging medium as functions of range. Signal emerging from delay means 92 is applied to the intensity modulation terminals of bright-spot oscilloscope 94. The spot-position-determining terminals of oscilloscope 94 are served by a sweep-timing-control system 90, which provides a precisely-repeatable constant-velocity motion of the bright spot, initiated by a start synchronizing pulse from the master-signal generator just before the commencement of each master-signal pulse-train signature. Just after the completion of each master-signal signature, the bright spot is blanked and quickly returned to its starting position by a finish synchronizing pulse from the master-signal generator.

In addition to starting, sweeping, blanking, stopping and returning the bright-spot display, the sweep-timing-control system is also coordinated with the motion of slider 110 in delay means 92, as explained hereinafter.

Figure 6:
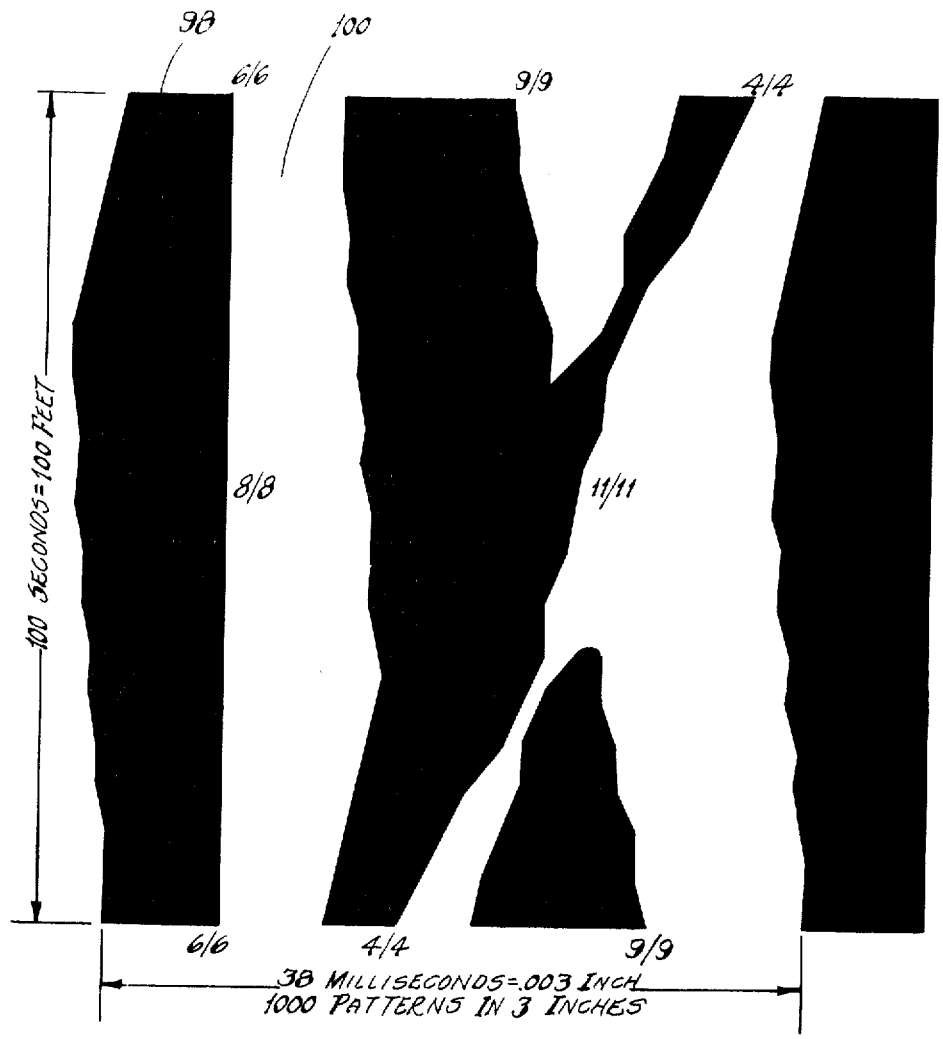
FIG. 6 is a diagram illustrating a single three-tone section (horizontal) of the delayed reference function as it appears on the film for one 100-second interval (vertical)
Figure 7:
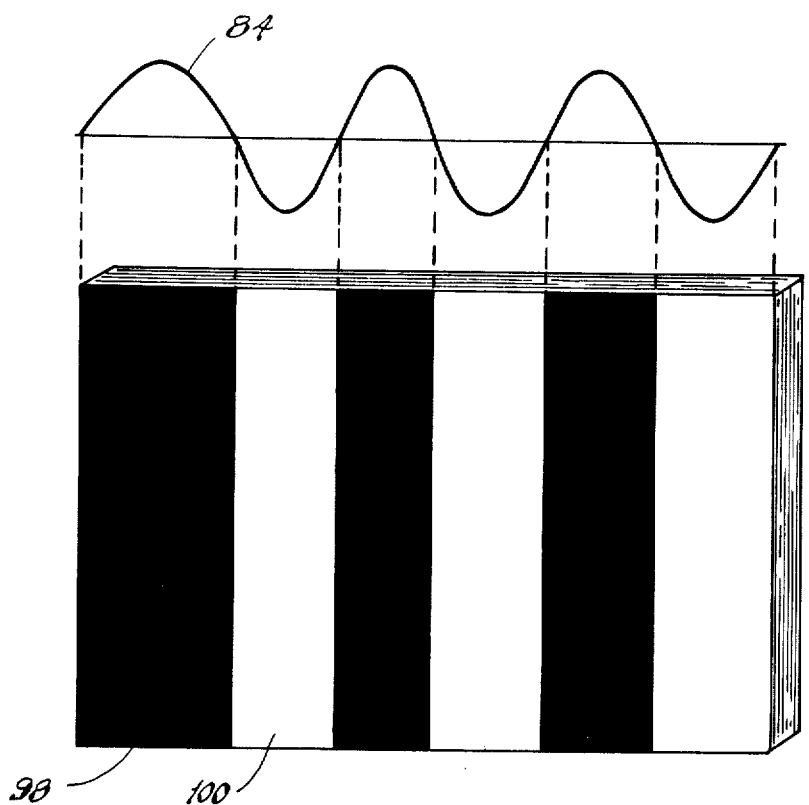
FIG. 7 is a diagram illustrating the correspondence between a signal waveform and its pattern on film.

As shown in FIG. 6, the reference function on the film loop 70 forms a variable-density pattern which looks very much like a grating having lines running more or less parallel to the edges of the film loop. For the hypothetical example we have taken, if the transverse dimension of the film loop is three inches, 1000 repetitive patterns will be recorded across this dimension. The pattern is compressed laterally to permit its repetition a thousand times across the width of the film to cover a gate 75 millimeters wide in the photooptical correlator. The single transverse pattern shown illustrates how a waveform with a signature 6/6, 4/4, 9/9 at the bottom of the figure changes into a waveform with a signature 6/6, 9/9, 4/4 at the top. This figure shows the full length of the loop greatly compressed and a portion of the transverse pattern greatly expanded. For the sake of clarity, the pattern is in the form of black and white bars 98 and 100 which change from black to white at the signal-axis crossover points of the waveform. Actually, however, these bars would be shades of gray which gradually grow darker and lighter in accordance with the polarity and amplitude level of the waveform. The correspondence between the bars 98 and 100 and an input signal waveform 84 is indicated more clearly in FIG. 7. The pattern recorded on the film may be said to be a photographic analog of the signal waveform and the pattern shown in FIG. 6 may be said to be the photographic analog of the transmitted signal waveform as it travels through the seawater medium.

An interpolating delay-line means 92 is shown in FIG. 8. Taps 102 of a delay line 104 which approximates the differential delay and amplitude characteristics of the medium are decoupled by buffer amplifiers 106 and conjoined by a continuous interpolative network 108 carrying a slider 110 moving uniformly or advanced in small increments with time. The slider 110 may be moved, for example, by a lead screw with a ratchet-advance mechanism operated by the finish synchronizing pulse from the master-signal generator 86 to advance the slider a slight amount after the completion of each repetition of the master-signal-generated signature but before the commencement of the next repetition of signature. Operating in this manner there is no motion of the slider 110 during each sweep of the intensity-modulated bright spot as the recording progresses.

Each time a signature from the master-signal generator 86 (having been modified by network 88) is fed into the input terminals 112 of the interpolating delay-line means 92, the signals derived from the movable tap or slider 110 represent the form of received signals extractable from the medium at progressively increasing ranges. By repeating the master-signal wave train over and over, and by properly timing the sweeping action of a photographic variable-density recording spot across the width of a moving film, a continuously changing variable-density derived reference function is created.

To recapituate: in an electronic system in which frequency-modulated wave-trains are transmitted through a system (consisting of transmitting and receiving electronic equipment, such as amplifiers, as well as a propagating medium) which propagates wave components of different periodicities at different velocities, the teaching of this invention is to operate upon the original waveshape, or reference function, so as to evolve it in accordance with the transfer functions of the equipment and the medium. The received waveshape will then correlate to a high degree with the evolved reference function. This is in contrast to the teaching of present correlation systems which attempt to correct the distortions present in the received waveform so that the latter will correlate to a high degree with the unmodified, original reference function.

Of course, the original reference function can also be evolved in accordance with the transfer function of only the electronic equipment through which it passes if the distortions introduced by the medium are small, or in accordance with the transfer function of only the medium if the distortions introduced by the electronic equipment are small.

Obviously many modifications and variations of the present invention are possible in the light of the above teachings. It is therefore to be understood that within the scope of the appended claims the invention may be practiced otherwise than as specifically described.

I claim:

1. A method for correlating frequency-modulated signal wavetrains with their return-signal wavetrains after propagation through a distorting medium comprising the steps of:

generating a frequency-modulated, repeatable series of electrical undulations known as the "original reference function";

transmitting said original reference function through a medium after passing it through suitable transmitting electronic equipment to prepare it for transmission through such a medium;

receiving the transmitted signal and passing it through suitable receiving electronic equipment to derive a medium-and-equipment-distorted signal therefrom;

passing said original reference function through means which simulate the transfer function of the transmitting and receiving electronic equipment through which said original reference function has passed and through means which simulate the transfer function of said medium according to the range in the medium over which the signal has been propagated, the final signal being known as the "evolved reference function";

making a record of the evolved reference function; and correlating the medium-and-equipment-distorted signal with the evolved reference function.

2. A method for correlating frequency-modulated signal wavetrains with their return-signal wavetrains after propagation through a distorting medium comprising the steps of:

generating a frequency-modulated, repeatable series of electrical undulations known as the "original reference function";

transmitting said original reference function through a medium after passing it through suitable transmitting electronic equipment to prepare it for transmission through such a medium;

receiving the transmitted signal and passing it through suitable receiving electronic equipment to derive a medium-and-equipment-distorted signal therefrom;

passing said original reference function through means which simulate the transfer function of the transmitting and receiving electronic equipment through which said original reference function has passed and through means which simulate the transfer function of said medium according to the range in the medium over which the signal has been propagated, the final signal being known as the "evolved reference function";

making a record of the evolved reference function, said record comprising the analog of a series of evolved reference functions, each succeeding one being for a greater range than the previous one; and correlating the medium-and-equipment-distorted signal with the evolved reference function.

3. A method for correlating frequency-modulated signal wavetrains with their return-signal wavetrains after propagation through a distorting medium comprising the steps of:

generating a frequency-modulated, repeatable series of electrical undulations known as the "original reference function";

transmitting said original reference function through a medium after passing it through suitable transmitting electronic equipment to prepare it for transmission through such a medium;

receiving the transmitted signal and passing it through suitable receiving electronic equipment to derive a medium-and-equipment-distorted signal therefrom;

passing said original reference function through means which simulate the transfer function of the transmitting and receiving electronic equipment through which said original reference function has passed and through means which simulate the transfer function of said medium according to the range in the medium over which the signal has been propagated, the final signal being known as the "evolved reference function";

making a record of the evolved reference function, said record comprising the analog of a series of evolved reference functions, each succeeding one being for a greater range than the previous one, said record being made on a continuous loop of recording material; and correlating the medium-and-equipment-distorted signal with the evolved reference function.

* * * * *